(12) United States Patent
Kim et al.

(10) Patent No.: US 7,910,164 B2
(45) Date of Patent: Mar. 22, 2011

(54) BIFUNCTIONAL MAGNETIC CORE-SEMICONDUCTOR SHELL NANOPARTICLES AND MANUFACTURING METHOD THEREOF

(75) Inventors: Young Keun Kim, Seoul (KR); Hong Ling Liu, Henan (CN); Jun Hua Wu, Anhui (CN); Ji Hyun Min, Seoul (KR); Ju Hun Lee, Seoul (KR)

(73) Assignee: Korea University Foundation (KR)

( * ) Notice: Subject to any disclaimer, the term of this patent is extended or adjusted under 35 U.S.C. 154(b) by 545 days.

(21) Appl. No.: 11/860,002

(22) Filed: Sep. 24, 2007

(65) Prior Publication Data
US 2008/0075957 A1 Mar. 27, 2008

(30) Foreign Application Priority Data
Sep. 26, 2006 (KR) ................. 10-2006-0093351

(51) Int. Cl.
*B05D 7/00* (2006.01)
*B32B 5/16* (2006.01)
(52) U.S. Cl. ............... 427/212; 427/215; 427/443.1; 428/403
(58) Field of Classification Search .......... 428/403; 427/212, 215, 443.1
See application file for complete search history.

(56) References Cited

U.S. PATENT DOCUMENTS

| 6,576,291 | B2 * | 6/2003 | Bawendi et al. | 427/215 |
| 6,962,685 | B2 * | 11/2005 | Sun | 423/632 |
| 6,992,155 | B2 * | 1/2006 | Okayama et al. | 526/183 |
| 7,147,712 | B2 * | 12/2006 | Zehnder et al. | 117/68 |
| 7,229,497 | B2 * | 6/2007 | Stott et al. | 117/68 |
| 7,235,228 | B2 * | 6/2007 | Carpenter et al. | 424/9.32 |
| 7,261,940 | B2 * | 8/2007 | Klimov et al. | 428/403 |
| 7,592,042 | B1 * | 9/2009 | Koike | 427/215 |
| 7,670,679 | B2 * | 3/2010 | Krishna et al. | 428/403 |
| 2003/0129608 | A1 | 7/2003 | Mirkin et al. | |
| 2004/0208825 | A1 | 10/2004 | Carpenter et al. | |
| 2006/0070491 | A1 | 4/2006 | Yang et al. | |

FOREIGN PATENT DOCUMENTS

| KR | 1020050026227 | 3/2005 |
| KR | 1020060051411 | 5/2006 |

* cited by examiner

*Primary Examiner* — H. (Holly) T Le
(74) *Attorney, Agent, or Firm* — Grossman, Tucker, Perreault & Pfleger, PLLC (57) ABSTRACT

Provided are bifunctional magnetic core-semiconductor shell nanoparticles and a manufacturing method thereof. The method includes mixing magnetic core material precursors and a reducing agent for the core material precursors; preparing a first mixture solution; heating and cooling the first mixture solution and preparing magnetic core materials; mixing the magnetic core materials with semiconductor shell material precursors and a reducing agent for the semiconductor shell material precursors; preparing a second mixture solution; and heating and cooling the second mixture solution and coating the magnetic core materials with the semiconductor shell materials.

10 Claims, 10 Drawing Sheets

BIFUNCTIONAL MAGNETIC CORE-SEMICONDUCTOR SHELL NANOPARTICLES AND MANUFACTURING METHOD THEREOF

PRIORITY

This application claims priority under 35 U.S.C. §119(a) to an application entitled "Bifunctional magnetic core—semiconductor shell nanoparticles and manufacturing method thereof" filed in the Korean Intellectual Property Office on Sep. 26, 2006 and assigned Serial No. 2006-93351, the contents of which are herein incorporated by reference.

BACKGROUND OF THE INVENTION

1. Field of the Invention

The present invention relates generally to a method for synthesizing magnetic core-semiconductor shell nanocrystals, and in particular, to magnetic core-semiconductor shell nanoparticles with high crystallization degree, uniform size, and high chemical stability and a manufacturing method thereof.

2. Description of the Related Art

Magnetic nanoparticles are applicable to various fields such as high-density magnetic recorder, sensor, and catalyst owing to their possibility for chemical synthesis. Particularly, magnetite ($Fe_3O_4$) nanoparticles occupy a singular position in the field of magnetic materials owing to their special physiochemical properties. Many researches have been conducted for physical phenomena such as charge ordering, mixed valence, and metal-insulator transition known as the Verwey transition.

As recent researches in bioscience become active, magnetite including other forms of iron oxide nanoparticles has been highlighted for biomedical applications owing to its exceptional biocompatibility.

Researches for coating magnetic nanoparticles being capable of controlling a position by the magnetic field with materials performing a specific function to make a core shell structure have been actively conducted.

Particularly, in the case where magnetic nanoparticles are coated with semiconductors, they incorporate the functions of catalysis, enhanced photoluminescence, protective layers, enhanced processibility, engineered band structures, improved stability against photochemical oxidation, and conjugation layers with biological molecules. Such magnetic-semiconductor core-shell structures can have magnetic properties, semiconductor properties, physical properties of inorganic and organic materials, and versatile functions ranging from metallic to dielectric materials. The magnetic-semiconductor core-shell structure is expected to deliver various potential functionalities in areas such as high-density data storage, biomedical applications, magnetic refrigeration, catalysts, and ferrofluids.

Cadmium selenide (CdSe) is a highly efficient luminescent semiconductor quantum-dot material. It is anticipated that the fusion of these two materials into a core-shell nanostructure should produce a new nanostructured material which retains the optical and magnetic properties of respective components, providing synergistically enhanced performance and functionalities which go beyond those of the individual components.

Thus, there is a demand for manufacturing $Fe_3O_4$/CdSe core-shell nanoparticles applicable to bio-separation, bio-manipulation, bio-assaying, vector delivery, and specific detection owing to their optical element sensing and magnetic actuation. For the same reasons, there is a demand for manufacturing magnetic-semiconductor core-shell nanoparticles such as $Fe_3O_4$@CdTe, $Fe_3O_4$@CdS, CoPt@CdSe, and FePt@CdSe.

Further, there is a demand for a technology for manufacturing magnetic-semiconductor core-shell nanoparticles having high crystallization degree, uniform size, and high chemical stability for enhanced applications and having both magnetic and semiconductor properties.

SUMMARY OF THE INVENTION

An aspect of the present invention is to substantially solve at least the above problems and/or disadvantages and to provide at least the advantages below. Accordingly, an aspect of the present invention is to provide bifunctional magnetic-semiconductor core-shell nanoparticles having both magnetic properties and semiconductor properties and a manufacturing method for synthesizing the same.

Another aspect of the present invention is to provide bifunctional magnetic-semiconductor core-shell nanoparticles having high crystallization degree, uniform size, and high chemical stability and a manufacturing method for synthesizing the same.

The above aspects are achieved by providing bifunctional magnetic core-semiconductor shell nanoparticles and a manufacturing method thereof.

According to one aspect of the present invention, there is provided a method for manufacturing bifunctional magnetic core-semiconductor shell nanoparticles by a sequential process. The method includes mixing magnetic core material precursors and a reducing agent for the core material precursors; mixing the resultant with a solvent for the magnetic core material precursors and the reducing agent and preparing a first mixture solution; heating the first mixture solution to a first temperature and maintaining the first mixture solution for a first period; cooling the first mixture solution to a room temperature and preparing magnetic core materials; mixing the magnetic core materials with semiconductor shell material precursors and a reducing agent for the semiconductor shell material precursors; mixing the resultant with a solvent for the semiconductor shell material precursors and the reducing agent and preparing a second mixture solution; heating the second mixture solution to a second temperature and maintaining the second mixture solution for a second period; and cooling the second mixture solution to a room temperature and coating the magnetic core materials with the semiconductor shell materials.

According to another aspect of the present invention, there is provided bifunctional magnetic core-semiconductor shell nanoparticles manufactured by a sequential process. The process includes mixing magnetic core material precursors, a reducing agent for the magnetic core material precursors, and a solvent for the core material precursors and the reducing agent to prepare a first mixture solution and heating and cooling the first mixture solution to prepare magnetic core materials; and in the same location where the magnetic core materials are prepared, mixing semiconductor shell material precursors, a reducing agent for the semiconductor shell material precursors, and a solvent for the semiconductor shell material precursors and the reducing agent to prepare a second mixture solution and heating and cooling the second mixture solution to coat the magnetic core materials with semiconductor shell materials.

Further, it is possible to provide other exemplary embodiments, or other exemplary embodiments by the modification or addition of elements.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention relates to a method for synthesizing magnetic core-semiconductor shell nanocrystals, and in particular, to magnetic core-semiconductor shell nanocrystals with high crystallization degree, uniform size, and high chemical stability and a manufacturing method thereof.

An example of bifunctional $Fe_3O_4$@CdSe nanoparticles that are a result of coating magnetite ($Fe_3O_4$) nanoparticles, magnetic materials, with CdSe that is a highly efficient luminescent semiconductor quantum-dot material will be described below. $Fe_3O_4$@CdSe, $Fe_3O_4$/CdSe, and $Fe_3O_4$—CdSe are merely different in expression method.

A magnetic core-semiconductor shell nanostructure of the present invention is completed through two sequential processes of manufacturing a magnetite core in a polyol preparation method and coating the magnetite core with CdSe by the reduction of cadmium (Cd) and selenium (Se).

In detail, magnetic/semiconductor core-shell nanoparticles with magnetite ($Fe_3O_4$) core and CdSe shell are prepared through a sequential preparation method by the reduction of appropriate precursors in the presence of solution containing polymer surfactants.

Figure 1A:
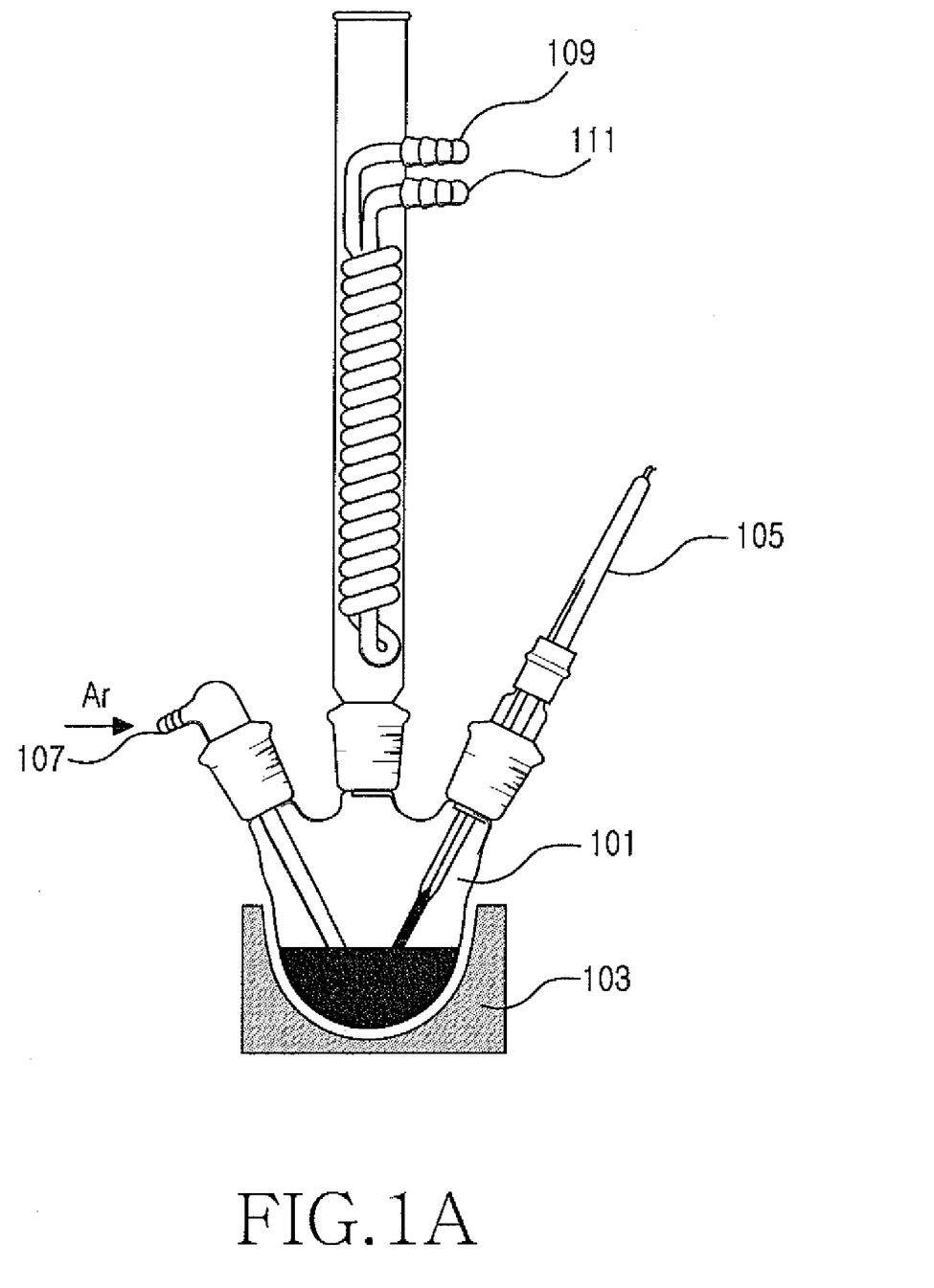
FIGS. 1A and 1B each are diagrams illustrating a device and a procedure for synthesizing magnetic core-semiconductor shell nanocrystals according to the present invention.
Figure 1B:
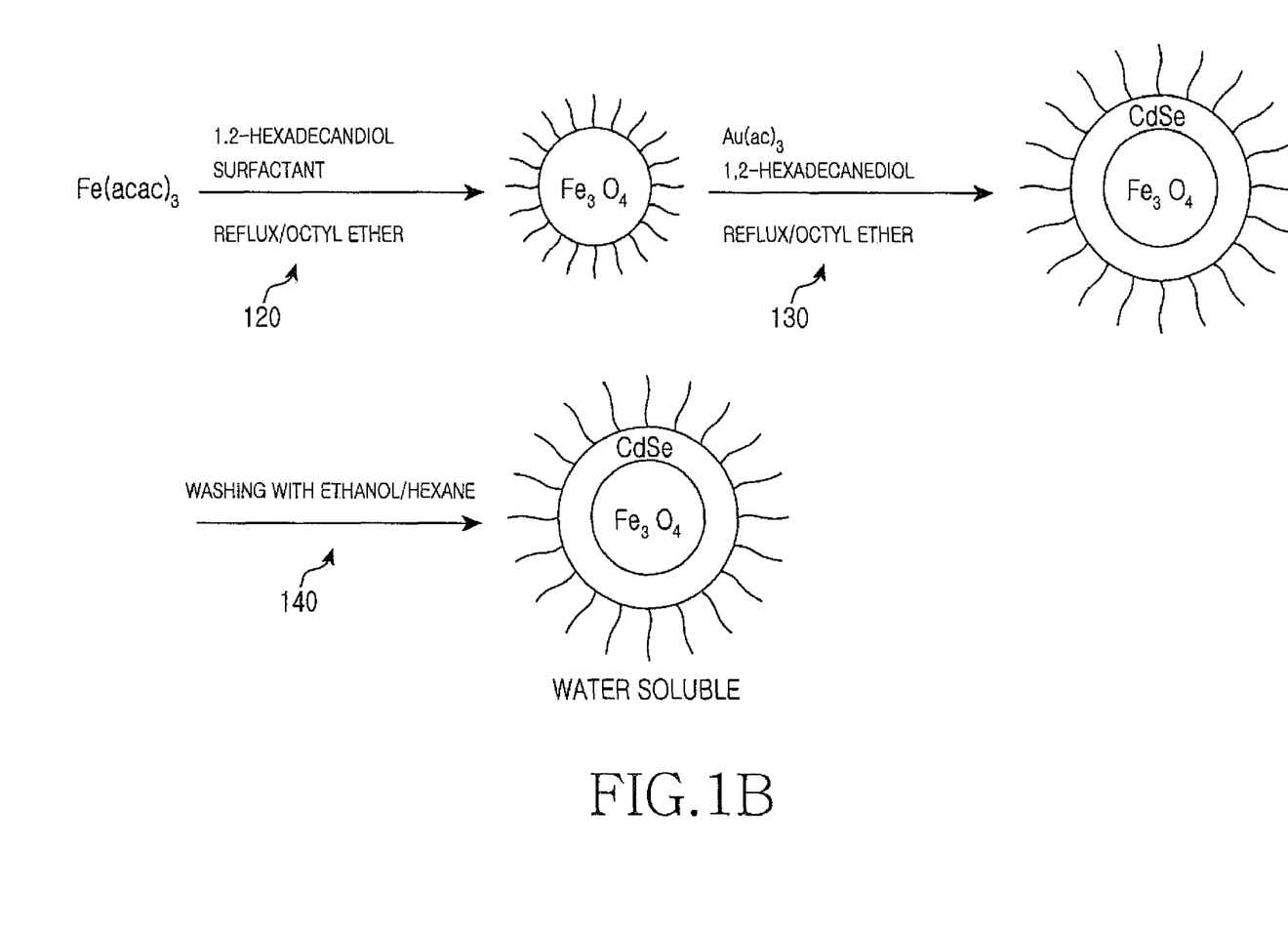

A detailed preparation method will be described below with reference to FIGS. 1A and 1B. FIGS. 1A and 1B show a $Fe_3O_4$@CdSe nanocrystals synthesis procedure according to the present invention.

Referring to FIG. 1A, first, an iron precursor, $Fe^{III}(acac)_3$ (ac=acetylacetonate; 0.5 mmol) (0.1766 g or 0.5 mmol), is put with reducing a gent, 1,2-hexadecanediol (0.6468 g, 2.5 mmol), in a 250 ml flask through an injection unit 111 for iron oxide nanoparticles synthesis.

$Fe_3O_4$ nanoparticles are prepared by the reduction of the iron precursor that is $Fe^{III}(acac)_3$ (ac=acetylacetonate; 0.5 mmol) by hexadecanediol (0.6468 g) in the presence of polymer surfactant molecules (polyethylene oxide-co-polypropylene oxide-co-polyethylene oxide or PEO-PPO-PEO; 0.7529 g) dissolved in dioctyl ether (10 ml to 20 ml). In the reduction process, the mixed solution is slowly heated to approximately 120° C. to 130° C. for about 1 hour and is circulated at approximately 120° C. to 130° C. for about 1 to 2 hours. After that, the mixed solution is quickly heated for about 15 minutes to about 300° C. and is circulated for about 1 to 2 hours at about 300° C. Preparation at such a high temperature is to consider refluxing. Next, the mixed solution is cooled to a room temperature to prepare the magnetic core materials. In synthesis process, the reaction mixture is heated using a heater 103. Argon gas, inertia gas, is injected through a gas injection unit 107. Gas generated during the synthesis process is exhausted through an exhaust unit 109.

Cadmium acetate (0.7 mmol, 186.6 mg) and selenium (1 mmol, 78.9 mg) dissolved in trioctyl phosphine (TOP, 99%; ~3 ml) are added to the mixed solution. For further homogenization, the reaction mixture is heated up to about 60° C. to 80° C. and about 100° C. using the heater 103 and is stirred with magnetic stirring for about 1 to 2 hours. Temperature is measured using a thermometer 105.

The formation of CdSe is completed by heating the mixture to about 130° C. and 160° C. and maintaining the mixture at about 130° C. and 160° C. for about 1 to 2 hours. In the synthesis process, argon gas, inertia gas, is injected through the gas injection unit 107, and gas generated during the synthesis process is exhausted through the exhaust unit 109.

After the reaction, $Fe_3O_4$@CdSe core-shell nanoparticles are precipitated by the addition of anhydrous ethanol, usually accelerated by centrifugation, and redispersed in hexane. This process is typically repeated twice to remove solvent molecules and other residuals from the nanocrystals.

The thus prepared core-shell nanoparticles can be stored in a solution for a long time without quality change. This means that heterogeneous materials are densely coated on a nanocrystal surface of a core portion.

Octyl ether rather than phenyl ethyl that is a general solvent is used. The dioctyl ether prepares $FeO_x$ (Fe and $Fe_3O_4$ mixture among which a majority is $Fe_3O_4$) as well as makes magnetite ($Fe_3O_4$). Further, the surfactants are tri-block copolymer (PEO-PPO-PEO), not small molecular surfactants.

Referring to FIG. 1B, Step 120 is a process of creating a magnetite core, Step 130 is a process of coating the magnetite core with CdSe, and Step 140 is a process of washing the coated result with ethanol/hexane.

FIGS. 2A to 2D each show an X-ray diffraction pattern for $Fe_3O_4$ nanoparticles, an X-ray diffraction pattern for $Fe_3O_4$@CdSe core-shell nanocrystals, a JCPDS graph for $Fe_3O_4$ synthesized according to the present invention, and a JCPDS graph for CdSe.

Figure 2:
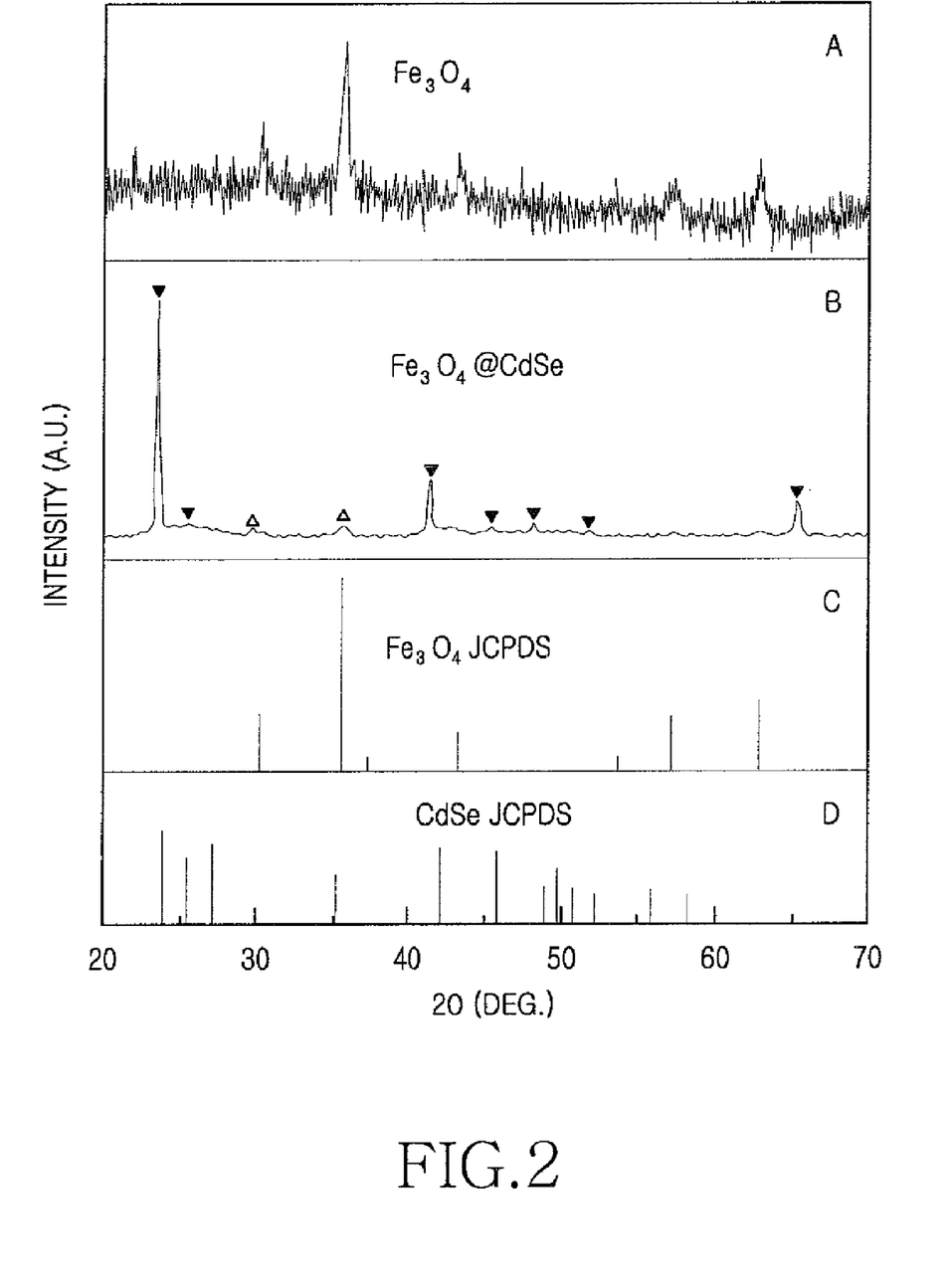
FIGS. 2A to 2D each show an X-ray diffraction pattern for $Fe_3O_4$ nanoparticles, an X-ray diffraction pattern for $Fe_3O_4$@CdSe core-shell nanocrystals synthesized according to the present invention, a Joint Committee on Powder Diffraction Standards (JCPDS) graph for $Fe_3O_4$, and a JCPDS graph for CdSe.

In detail, FIG. 2A shows $Fe_3O_4$ seed nanocrystals. FIG. 2B shows $Fe_3O_4$@CdSe core-shell nanocrystals with the identification of CdSe peaks and $Fe_3O_4$ peaks. FIG. 2C is a JCPDS graph for bulk $Fe_3O_4$. FIG. 2D is a JCPDS graph for bulk CdSe.

FIGS. 3A to 3D each show TEM morphology of $Fe_3O_4$ nanoparticles synthesized according to the present invention, HRTEM image demonstrating the monocrystalline nature of a seed particle, TEM morphology of $Fe_3O_4$@CdSe core-shell nanocrystals synthesized according to the present invention, and HRTEM image showing the monocrystalline nature of a nanocrystal.

Figure 3:
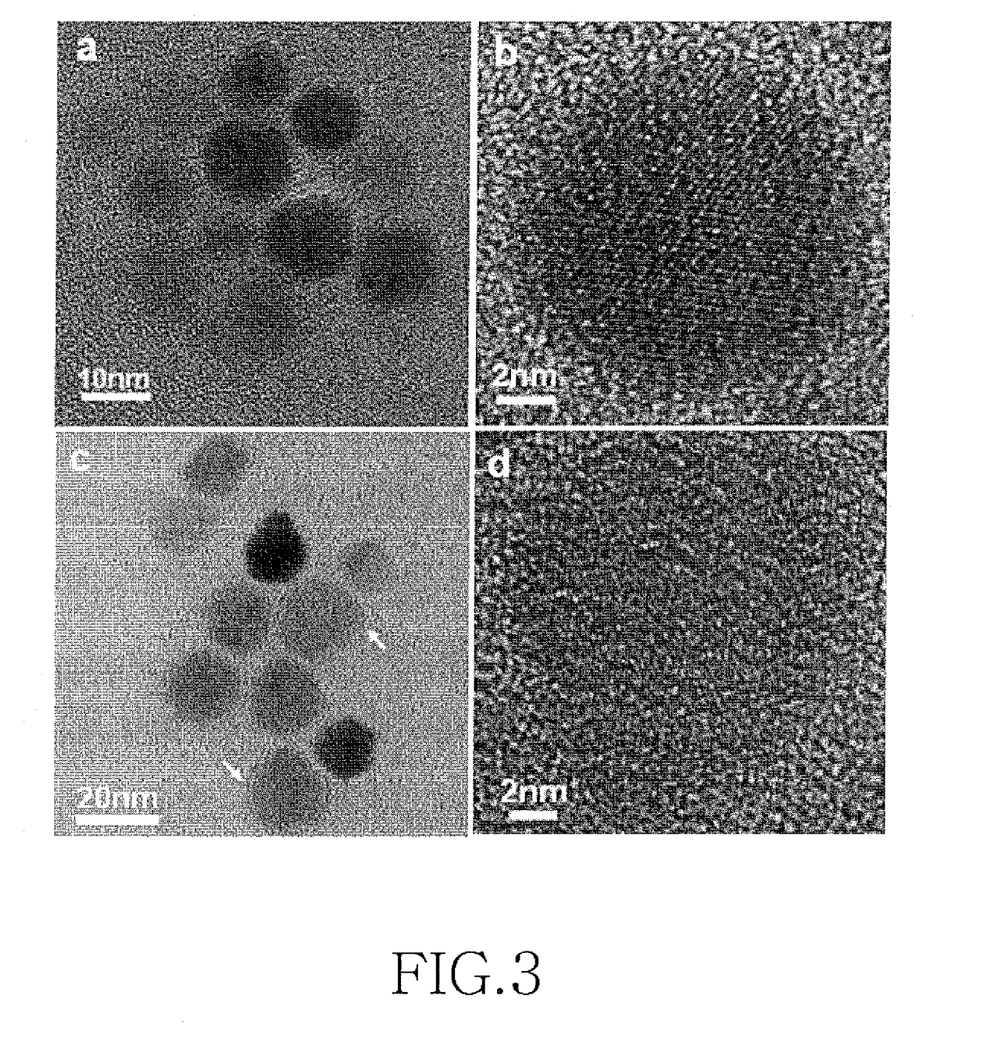
FIGS. 3A to 3D each show Transmission Electron Microscopy (TEM) morphology of $Fe_3O_4$ nanoparticles, High Resolution Transmission Electron Microscopy (HRTEM) image demonstrating the monocrystalline nature of a seed particle, TEM morphology of $Fe_3O_4$@CdSe core-shell nanocrystals synthesized according to the present invention, and HRTEM image showing the monocrystalline nature of a nanocrystal.

FIG. 3A is TEM morphology of $Fe_3O_4$ nanoparticles. FIG. 3B is HRTEM image showing the monocrystalline nature of a seed particle.

FIG. 3C is TEM morphology of $Fe_3O_4$@CdSe core-shell nanocrystals synthesized according to the present invention. Here, white arrows indicate CdSe shells. FIG. 3D is HRTEM image showing the monocrystalline nature of a nanocrystal. Here, scales each are shown at lower left corners of the images.

Figure 4:
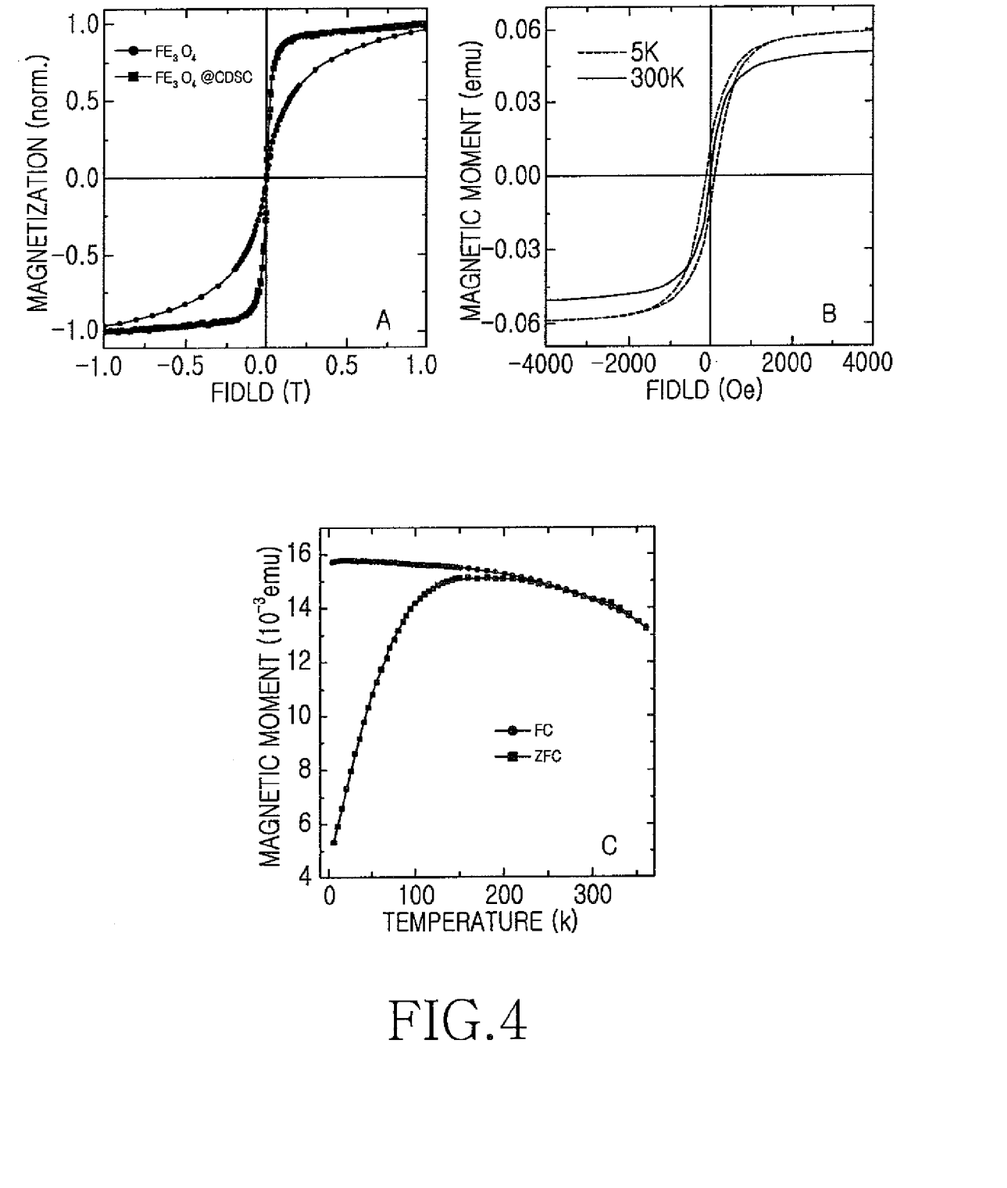
FIGS. 4A to 4C each show hysteresis curves measured at room temperature for $Fe_3O_4$ and $Fe_3O_4$@CdSe core-shell nanocrystals synthesized according to the present invention, a field dependent magnetization for $Fe_3O_4$@CdSe core-shell nanocrystals synthesized according to the present invention, measured at 5 K and 300 K, a temperature dependent magnetization for field cooled (red) and zero field cooled (black) $Fe_3O_4$@CdSe core-shell nanocrystals synthesized according to the present invention.

FIG. 4A show hysteresis curves measured at room temperature for $Fe_3O_4$@CdSe core-shell nanocrystals synthesized according to the present invention wherein the curve more vertical to Y-axis is a hysteresis curve for $Fe_3O_4$@CdSe core-shell nanocrystals and the comparison curve less vertical is a hysteresis curve for $Fe_3O_4$. FIG. 4B shows a field dependent magnetization for $Fe_3O_4$@CdSe core-shell nanocrystals synthesized according to the present invention, measured at 5 K and 300 K. FIG. 4C shows a temperature dependent magnetization for field cooled (red) and zero field cooled (black) $Fe_3O_4$@CdSe core-shell nanocrystals synthesized according to the present invention. The two curves converge at the blocking temperature, at which the transition from su perparamagnetic to ferromagnetic behavior ensues. In the case of the zero field cooled $Fe_3O_4$@CdSe core-shell nanocrystals, magnetization suddenly decreases below the blocking temperature.

Figure 5:
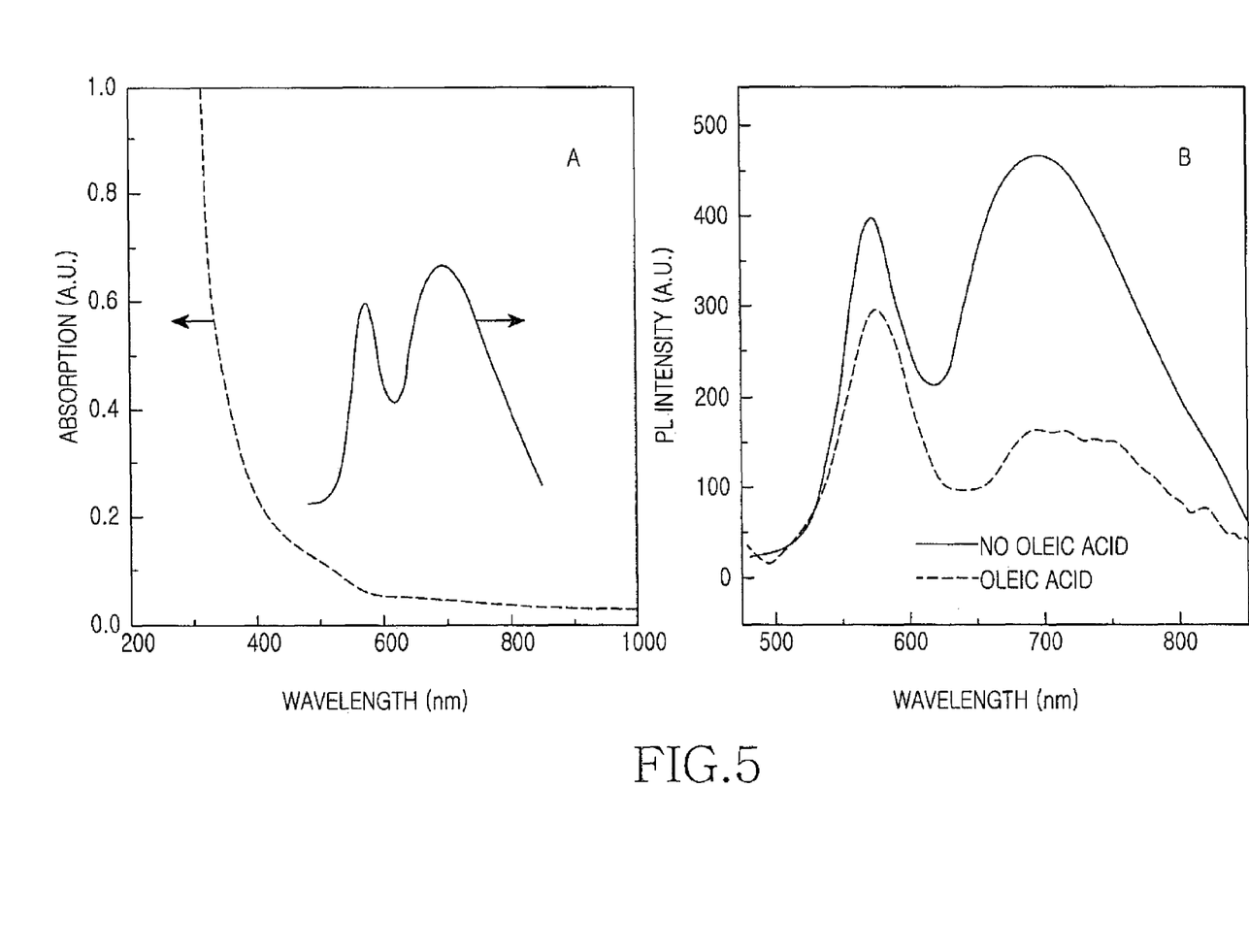
FIG. 5A shows optical properties of $Fe_3O_4$@CdSe core-shell nanocrystals synthesized according to the present invention: UV absorption and photoluminescence (PL) spectra
FIG. 5B is a graph showing photoluminescent properties before (upper curve) and after (lower curve) surface modification of $Fe_3O_4$@CdSe core-shell nanocrystals with oleic acid.

FIG. 5A shows optical properties of $Fe_3O_4$@CdSe core-shell nanocrystals synthesized according to the present invention: UV absorption and photoluminescence (PL) spectra. FIG. 5B is a graph showing photoluminescent properties before (upper curve) and after (lower curve) surface modification of $Fe_3O_4$@CdSe core-shell nanocrystals with oleic acid.

Figure 6:
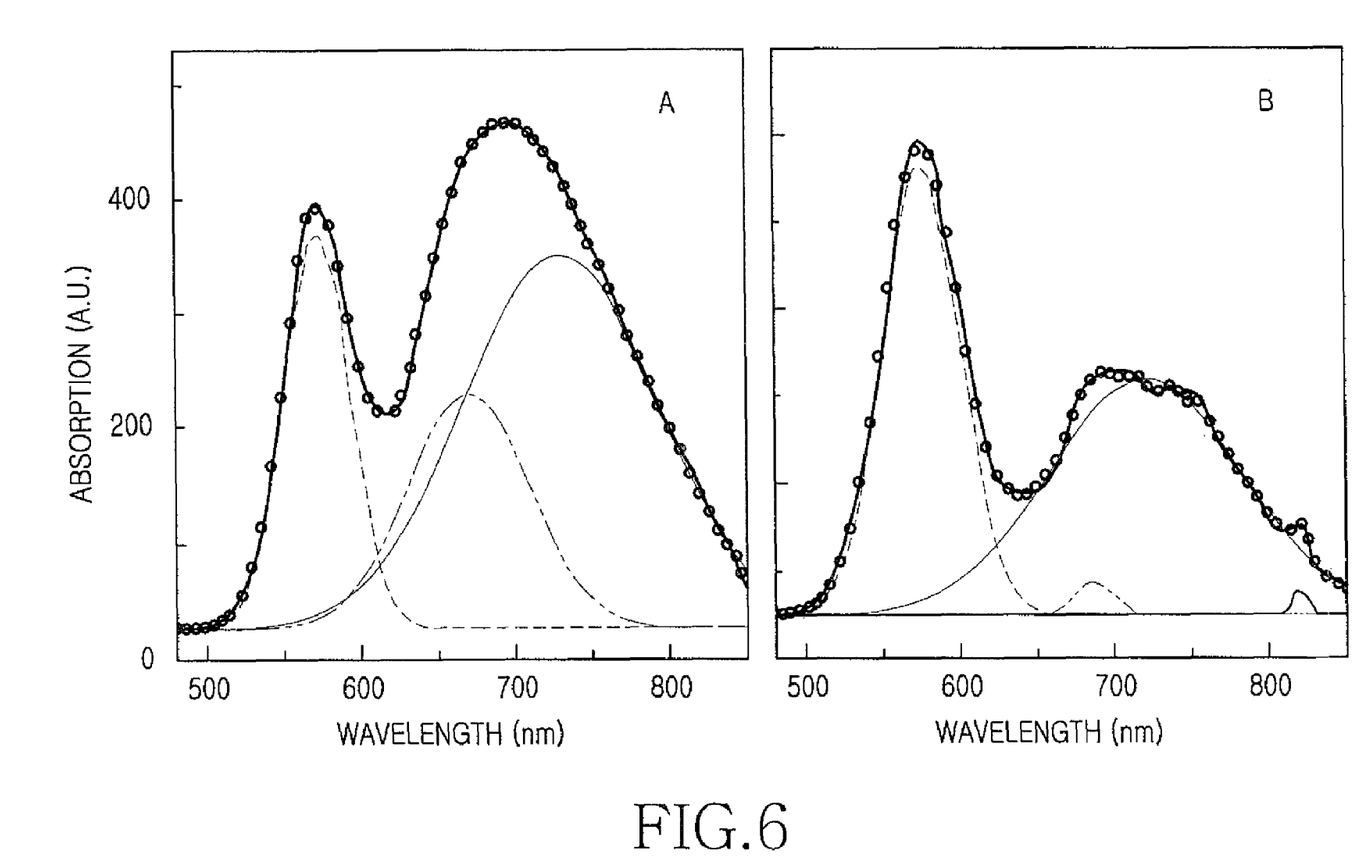
FIGS. 6A and 6B each are graphs illustrating deconvolution of photoluminescent spectrum of $Fe_3O_4$@CdSe core-shell nanocrystals synthesized according to the present invention without the addition of oleic acid and a deconvolution of photoluminescent spectrum of $Fe_3O_4$@CdSe core-shell nanocrystals with the addition of oleic acid.

FIGS. 6A and 6B each are graphs illustrating deconvolution of photoluminescent spectrum of $Fe_3O_4$@CdSe core-shell nanocrystals synthesized according to the present invention without the addition of oleic acid and a deconvolution of photoluminescent spectrum of $Fe_3O_4$@CdSe core-shell nanocrystals with the addition of oleic acid.

In detail, FIG. 6A shows deconvolution of photoluminescent spectrum of $Fe_3O_4$@CdSe core-shell nanocrystals synthesized according to the present invention without the addition of oleic acid. From this, it can be appreciated that the experimental data (bold curve) are in good agreement with the deconvolution of the spectrum into three Gaussian curves representing the emissions as demonstrated by their sum (in circles).

FIG. 6B shows deconvolution of photoluminescent spectrum of $Fe_3O_4$@CdSe core-shell nanocrystals with the addition of oleic acid. From this, it can be appreciated that the experimental data (bold curve) are in good agreement with the deconvolution of the spectrum into four Gaussian curves representing the emissions as demonstrated by their sum (in circles).

Figure 7:
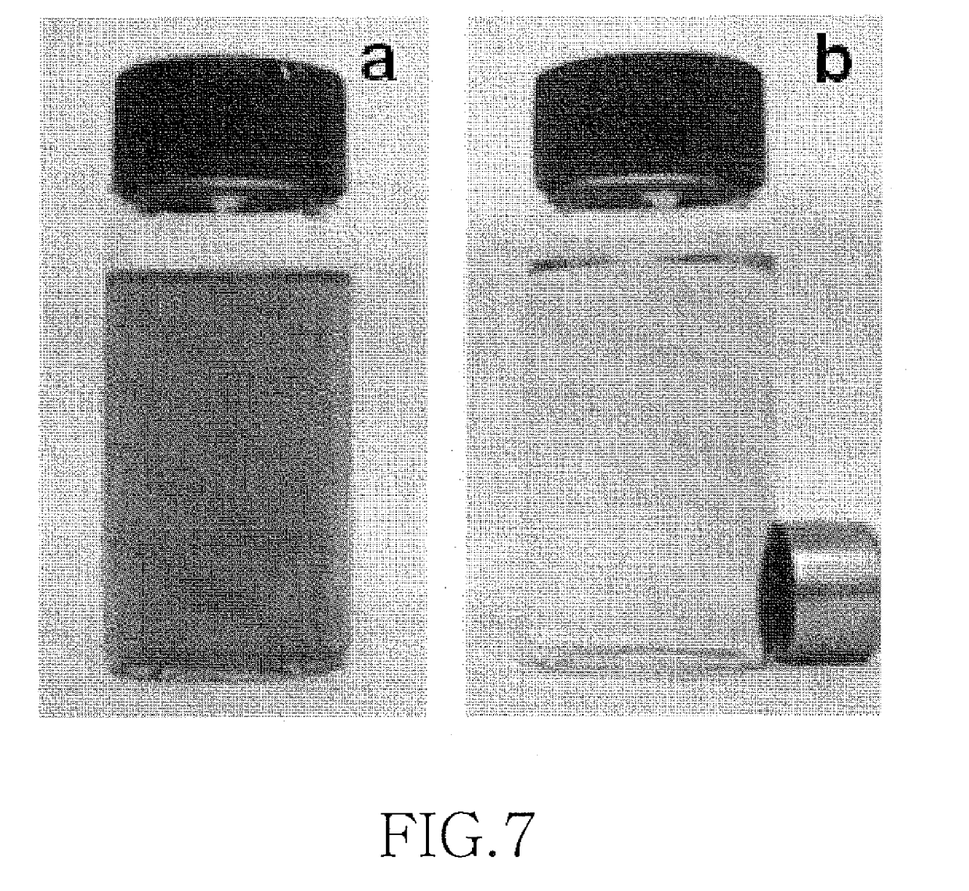
FIGS. 7A and 7B each are photograph images of magnetic-luminescent $Fe_3O_4$@CdSe core-shell nanocrystals synthesized according to the present invention: (a) absence of magnetic field and (b) presence of magnetic field.

FIGS. 7A and 7B each are photograph images of magnetic-luminescent $Fe_3O_4$@CdSe core-shell nanocrystals synthesized according to the present invention: (a) absence of magnetic field and (b) presence of magnetic field.

In detail, FIG. 7A is a photograph image of the dispersion of core-shell nanoparticles with the absence of magnetic field and FIG. 7B is a photograph image showing a figure in which nanoparticles are attracted to a magnet with the presence of magnetic field.

TABLE 1

| Parameters | Peak I[a] | Peak II[b] | Peak III[b] | Peak IV[b] |
|---|---|---|---|---|
| Position (nm) | 571.7 | 669.7 | 729.1 | (820.5) |
|  | (575.8) | (687.1) | (720.6) |  |
| FWHM (nm) | 50.0 | 92.7 | 124.8 | (10.9) |
|  | (58.6) | (28.2) | (146.8) |  |
| Relative Intensity | 1.00 | 1.10 | 2.78 | (0.01) |
|  | (1.00) | (0.03) | (1.30) |  |

[a]Bandgap emission,
[b]Surface-related emission

Table 1 shows a comparison of peak positions, FWHM (Full Width at Half Maximum) values, and relative intensities of photoluminescent spectra of $Fe_3O_4$@CdSe core-shell nanocrystals after deconvolution with (data in brackets) and without addition of oleic acid.

Besides the bifunctional $Fe_3O_4$@CdSe core-shell nanoparticles described above, bifunctional core-shell nanoparticles with semiconductor shells such as $Fe_3O_4$@CdTe and $Fe_3O_4$@CdS can be manufactured according to the present invention. Cadmium telluride (CdTe) and cadmium sulfide (CdS) have similar physical properties to CdSe.

In addition to this, bifunctional core-shell nanoparticles with magnetic cores such as CoPt@CdSe, FePt@CdSe, CoPt@CdS, FePt@CdS, CoPt@CdTe and FePt@CdTe can be manufactured according to the present invention.

According to the present invention, magnetic core-semiconductor shell nanoparticles with high crystallization degree, uniform size, and high chemical stability can be synthesized in sequential processes. For example, in a magnetite-cadmium selenide ($Fe_3O_4$@CdSe) core-shell structure, bifunctional magnetite-cadmium selenide nanocrystals can be synthesized by a procedure of preparing magnetite seeds corresponding to cores by the reduction of magnetite precursors and then, coating the magnetite with CdSe by the sequential reduction of CdSe precursors.

Another example of magnetic core-semiconductor shell nanoparticles according to the present invention, magnetite-zinc oxide (Fe$_3$O$_4$@ ZnO) core-shell nanocrystals is produced as follows. In a 250 ml flask, mixed Iron(III) acetylacetonate (Fe(acac)$_3$)(0.1766 g or 0.5 mmol) in 10~15 ml octyl ether (C$_8$H$_{17}$OC$_8$H$_{17}$, 99%) with reducing agent, 1,2-hexadecanediol (C$_{14}$H$_{29}$CH(OH)CH$_2$ (OH), 90%) (0.6468 g, 2.5 mmol), surfactant and co-surfactant such as polyvinylpyrrolidone (PVP) (0.5 g), tri-block copolymer poly(ethylene glycol)-block-poly (propylene glycol)-block-poly(ethylene glycol) (PEO-PPO-PEO) (0.4~1.2 g), or oleic acid (OA) (C$_9$H$_{18}$=C$_8$H$_{15}$COOH, 99%) (0.5 ml or 1.5 mmol) and oleylamine (OAM, C$_9$H$_{18}$=C$_9$H$_{17}$NH$_2$, 70%) (0.5 ml or 1.5 mmol) with vigorous stirring. The reaction mixture was slowly heated to 125° C. within 10 min, refluxed for 1 h at 125° C., rapidly heated to 300° C. within 15 min and refluxed at the temperature for 1 h. After cooling down to room temperature, Zn(acac)$_2$ (0.0659 g or 0.25 mmol), 1.2-hexadecanediol (0.88 g, 1.25 mmol) and 5 ml octyl ether were added to the flask. Under vigorous stirring, the reaction mixture was heated to 80° C. within 10 min, refluxed for 2 h at 80° C., then rapidly heated to 300° C. within 15 min. and refluxed for 1 h at 300° C. After cooling down to room temperature, ethanol was added into the reactant mixture to precipitate the nanoparticles. The precipitated product was washed with ethanol/hexane (1:2) twice, and re-dispersed in hexane for further use.

Figure 8:
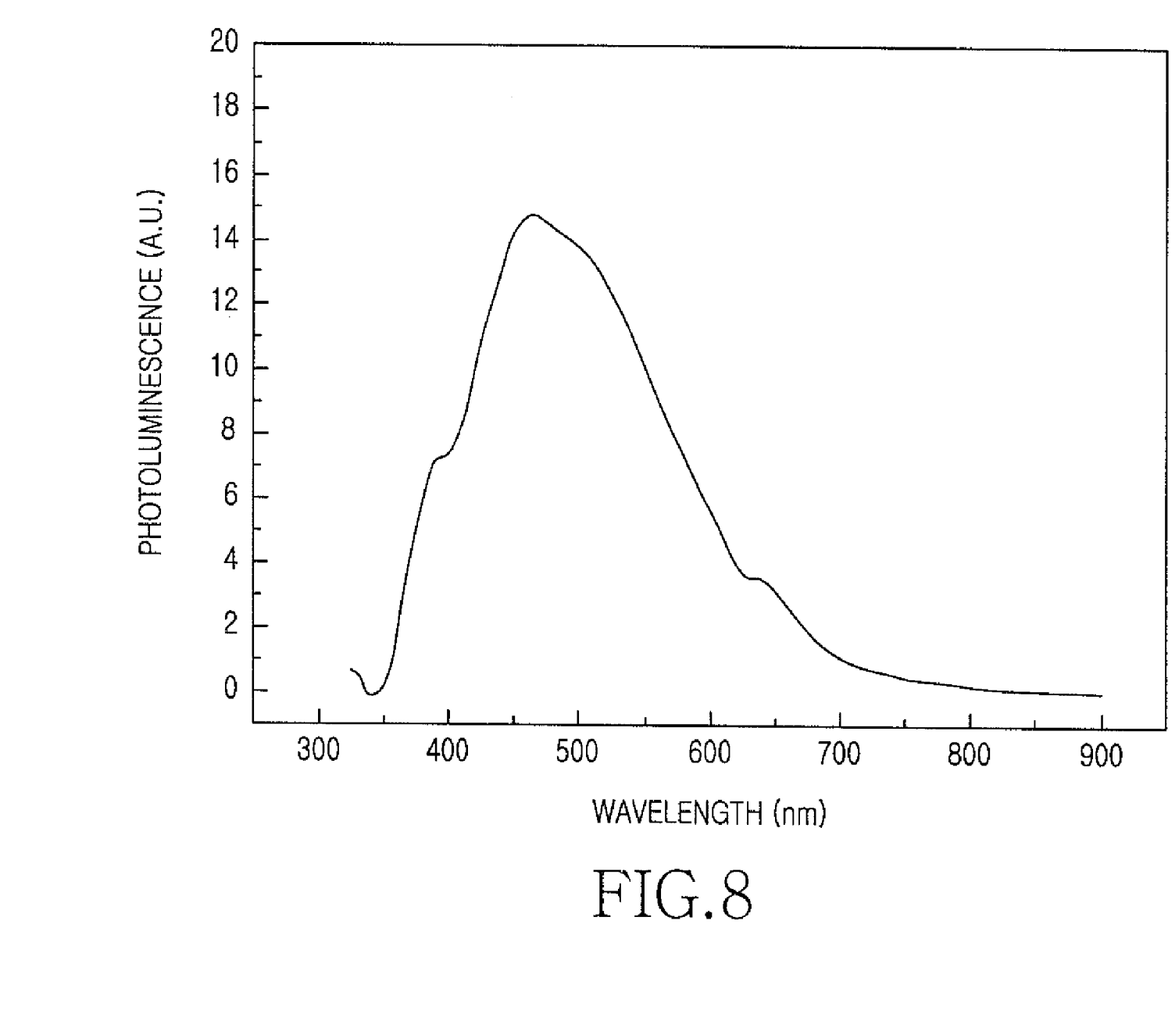
FIG. 8 is a graph illustrating luminescence spectrum of $Fe_3O_4$@ZnO core-shell nanocrystals.

FIG. 8 is a graph illustrating luminescence spectrum of Fe$_3$O$_4$@ZnO core-shell nanocrystals according to the present invention.

Figure 9:
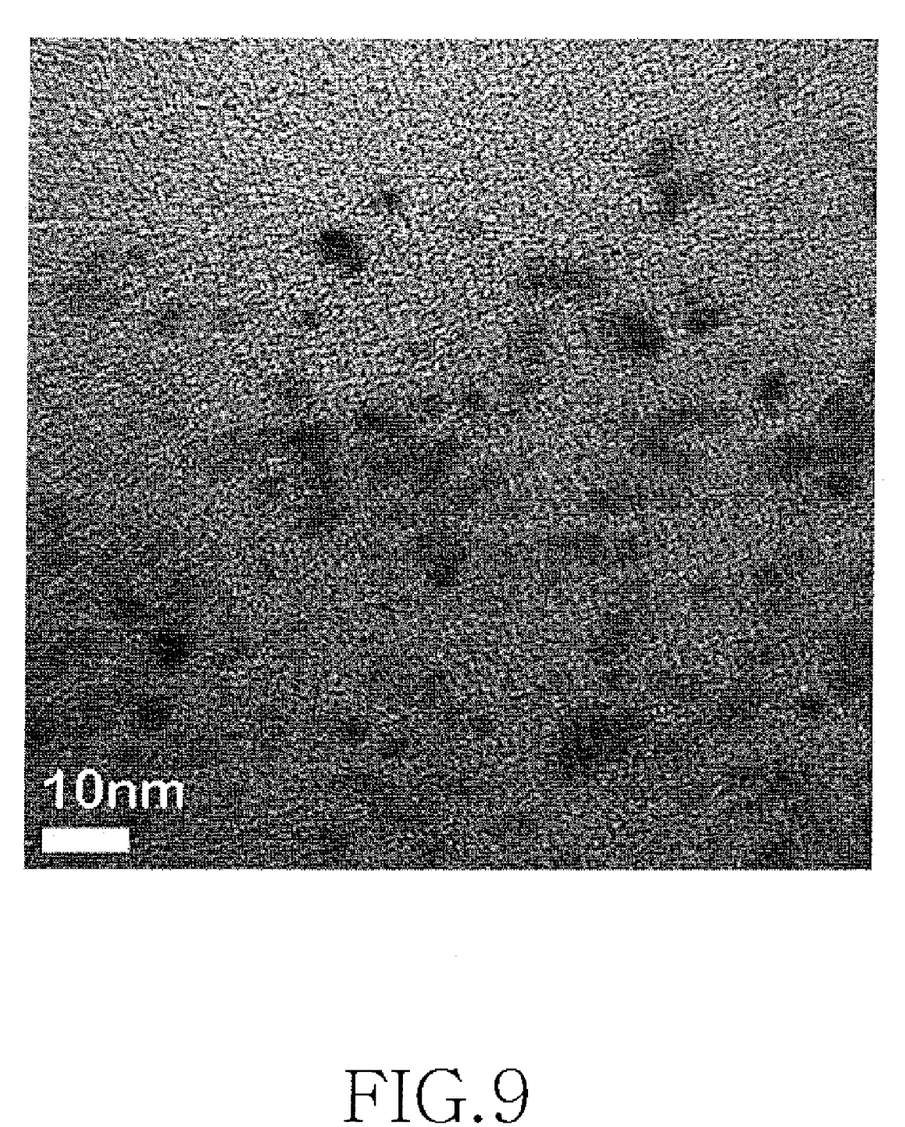
FIG. 9 shows Transmission Electron Microscopy (TEM) morphology of $Fe_3O_4$@ZnO core-shell nanocrystals synthesized according to the present invention.

FIG. 9 shows Transmission Electron Microscopy (TEM) morphology of Fe$_3$O$_4$@ZnO core-shell nanocrystals synthesized according to the present invention.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for manufacturing bifunctional magnetic core-semiconductor shell nanoparticles by a sequential process, the method comprising:
    mixing magnetic core material precursors and a reducing agent for the core material precursors;
    mixing the resultant with a solvent for the magnetic core material precursors and the reducing agent and preparing a first mixture solution;
    heating the first mixture solution to a first temperature and maintaining the first mixture solution for a first period;
    cooling the first mixture solution to a room temperature and preparing magnetic core materials;
    mixing the magnetic core materials with semiconductor shell material precursors and a reducing agent for the semiconductor shell material precursors;
    in the same location where magnetic core materials are prepared, mixing the resultant with a solvent for the semiconductor shell material precursors and the reducing agent and preparing a second mixture solution, wherein the solvent for the semiconductor shell material precursors is the same as the solvent for the magnetic core material precursors;
    heating the second mixture solution to a second temperature and maintaining the second mixture solution for a second period; and
    cooling the second mixture solution to a room temperature and coating the magnetic core materials with the semiconductor shell materials,
    wherein the preparing of the first mixture solution further comprises adding a polymer surfactant,
    wherein the preparing of the second mixture solution further comprises adding a polymer surfactant, and
    wherein the core is magnetite (Fe$_3$O$_4$) and the semiconductor shell is zinc oxide (ZnO).

2. The method of claim 1, further comprising: precipitating the bifunctional nanoparticles by the addition of ethanol and performing separation using a centrifugal separator.

3. The method of claim 1, wherein the polymer surfactant in the first mixture solution is tri-block copolymer (PEO-PPO-PEO).

4. The method of claim 1, wherein the polymer surfactant in the second mixture solution is tri-block copolymer (PEO-PPO-PEO).

5. The method of claim 1, further comprising:
    maintaining the first mixture solution at the first temperature for a constant time; and
    heating the first mixture solution by a third temperature higher than the first temperature and maintaining the first mixture solution for a third period.

6. The method of claim 1, further comprising:
    maintaining the second mixture solution at the second temperature for a constant time; and
    heating the second mixture solution by a fourth temperature higher than the second temperature and maintaining the second mixture solution for a fourth period.

7. A method for manufacturing bifunctional magnetite-CdSe core-shell nanoparticles by a sequential process, the method comprising:
    mixing magnetite precursors, Fe$^{III}$(acac)$_3$, with a reducing agent for the magnetite precursors;
    mixing the resultant with dioctyl ether, a solvent, and preparing a first mixture solution;
    heating the first mixture solution to 300° C. and maintaining the first mixture solution for 1 to 2 hours;
    cooling the first mixture solution by a room temperature and preparing magnetite cores;
    mixing the magnetite cores with cadmium acetate and selenium and a reducing agent for the cadmium acetate and selenium;
    mixing the cadmium acetate and selenium and the reducing agent with trioctyl ether and preparing a second mixture solution;
    heating the second mixture solution to 130° C. through 160° C. and maintaining the second mixture solution for 1 to 2 hours; and
    cooling the second mixture solution by a room temperature and coating the magnetite cores with the CdSe shells,
    wherein the preparing of the first mixture solution further comprises adding a tri-block copolymer (PEO-PPO-PEO) as a surfactant.

8. The method of claim 7, further comprising: precipitating the bifunctional nanoparticles by the addition of ethanol and performing separation using a centrifugal separator.

9. The method of claim 7, wherein the preparing of the second mixture solution further comprises: adding tri-block copolymer (Poly(Ethylene Oxide)-Poly(Propylene Oxide)-Poly(Ethylene Oxide): PEO-PPO-PEO) as a surfactant.

10. A method for manufacturing bifunctional magnetic core-semiconductor shell nanoparticles by a sequential process, the method comprising:
    mixing magnetic core material precursors, a reducing agent for the magnetic core material precursors, and a solvent for the core material precursors and the reducing agent to prepare a first mixture solution and heating and cooling the first mixture solution to prepare magnetic core materials; and in the same location where magnetic core materials are prepared, mixing semiconductor shell material precursors, a reducing agent for the semiconductor shell material precursors, and a solvent for the semiconductor shell material precursors and the reducing agent to prepare a second mixture solution and heating and cooling the second mixture solution to coat the magnetic core materials with semiconductor shell materials, wherein the solvent for the semiconductor shell material precursors is the same as the solvent for the core material precursors, wherein the first mixture solution further comprises a tri-block copolymer (PEO-PPO-PEO) surfactant.

* * * * *